United States Patent Office
3,077,474
Patented Feb. 12, 1963

3,077,474
ISOALLOXAZINES
Harold G. Petering, Kalamazoo, and Harry H. Fall, Kalamazoo Township, Kalamazoo County, Mich., assignors to The Upjohn Company, Kalamazoo, Mich., a corporation of Michigan
No Drawing. Filed Sept. 7, 1954, Ser. No. 454,627
21 Claims. (Cl. 260—251.5)

This invention relates to new and useful compositions of matter, and is more particularly directed to [ω-hydroxyalkyl]-isoalloxazines and to a method for the preparation of these compounds.

This application is a continuation-in-part of application Serial No. 364,190, filed June 25, 1953, now abandoned.

The novel [ω-hydroxyalkyl]-isoalloxazines are represented by the following general formula:

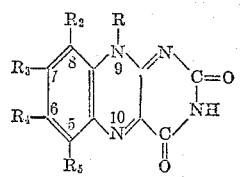

wherein R is an ω-hydroxyalkyl group containing from two to six carbon atoms inclusive, $R_3$ and $R_4$ are members selected from the group consisting of lower-alkyl, lower-alkoxy, amino and a polymethylene group linked to the aromatic ring to form a carbocyclic ring having six carbon atoms, $R_2$ and $R_5$ are members selected from the group consisting of hydrogen, lower-alkyl, lower-alkoxy, and amino, and wherein $R_2$, $R_3$, $R_4$ and $R_5$ when taken together include not more than one amino group.

It is an object of the present invention to provide novel compounds. Another object of this invention is to provide a process for the preparation of these new compounds. Other objects of the invention will be apparent to those skilled in the art to which this invention pertains.

These new and novel compounds possess anti-metabolite activity; for example, they are competitively active riboflavin antagonists. These compounds are also useful in the treatment of parasitic metazoal infestations in animals such as *Syphacia obvelata* in mice. In addition, the [ω-hydroxyalkyl]-isoalloxazines of the invention are effective in the treatment of infestations in dogs caused by worms such as tapeworm, hookworm, roundworm, and the like.

The [ω-hydroxyalkyl]-isoalloxazines are obtained by reacting an [ω-formylalkyl]-isoalloxazine of the formula:

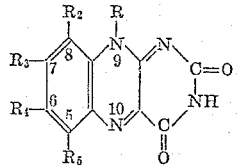

wherein R is an ω-formylalkyl group containing from two to six carbon atoms inclusive, $R_2$ and $R_5$ are members selected from the group consisting of hydrogen, lower-alkyl, lower-alkoxy, and amino, $R_3$ and $R_4$ are members selected from the group consisting of hydrogen, a polymethylene group linked to the aromatic ring to form a carbocyclic ring having six carbon atoms, lower-alkyl, lower-alkoxy, halo and amino, and wherein $R_2$, $R_3$, $R_4$ and $R_5$ when taken together include not more than one amino group, with a reducing agent, and more specifically, an alkali-metal hydride, to obtain the corresponding [ω-hydroxyalkyl]-isoalloxazine. The terms lower-alkyl and lower-alkoxy as used herein include alkyl and alkoxy groups containing from one to five carbon atoms inclusive.

A preferred procedure for preparing an [ω-hydroxyalkyl]-isoalloxazine according to the process of the present invention is to dissolve an [ω-formylalkyl]-isoalloxazine in a solvent such as an aqueous medium, an aqueous-alcoholic medium, or an acid or alkaline medium and then reduce the carbonyl group of the [ω-formylalkyl]-isoalloxazine by subjecting the resulting mixture, at a temperature maintained between about zero and 35 degrees centigrade, and advantageously at about 25 degrees centigrade, to the action of a reducing agent such as an alkali-metal hydride, advantageously, sodium borohydride. After the reaction is completed, the mixture is cooled, and then adjusted to a pH of about one to seven, and preferably between three to five, with a suitable acid such as hydrochloric acid, sulfuric acid, or the like. When cooling the mixture, an anti-foaming agent such as capryl alcohol or the like may be added thereto. The solid [ω-hydroxyalkyl]-isoalloxazine thus-formed is removed from the reaction mixture, washed with a solvent such as water, alcohol, ether, methyl isobutylketone, methylethylketone, or the like, and then dried. The preparation of the [ω-hydroxyalkyl]-isoalloxazines of the present invention is advantageously conducted in the absence of light.

While sodium borohydride is a preferred reducing agent in this process, other metal hydrides such as, for example, potassium borohydride, sodium hydride, potassium hydride, lithium aluminum hydride, lithium hydride, or the like, can also be used.

The starting [ω-formylalkyl]-isoalloxazines used in the preparation of the [ω-hydroxyalkyl]-isoalloxazines are obtained by reacting the corresponding polyhydroxyalkyl-isoalloxazine of the formula:

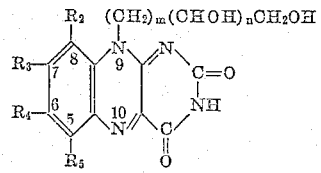

wherein $R_2$, $R_3$, $R_4$ and $R_5$ are as defined above, $m$ is an integer from one to five inclusive, and $n$ is an integer from one to four inclusive, with not more than 2.5 times $n$ equivalents of oxidizing agent per mole of polyhydroxyalkylisoalloxazine, to produce the corresponding [ω-formylalkyl]-isoalloxazine. The term equivalents refers to the molecular weight of the oxidizing agent divided by the total valence change of the oxidizing agent involved in the reaction. Suitable oxidizing agents include periodic acid, lead tetraacetate, or the like.

The polyhydroxyalkylisoalloxazines are prepared by known methods. For example, in one method, a polyhydroxyalkylisoalloxazine is obtained by subjecting an N-monosubstituted aromatic ortho-diamine to condensation with an alloxan compound (Kuhn, Ber. 67, 1939, 1934; Karrer, Helv. Chim. Acta. 18, 69, 1935). The condensation of the N-monosubstituted aromatic ortho-diamine with alloxan or N-monosubstituted products thereof to produce the isoalloxazine is preferably performed in an acid solution, for instance, in the presence of a mineral acid such as hydrochloric, hydrobromic, sulfuric, nitric and phosphoric acid; but the condensation may also be carried out in a strong acetic acid solution, preferably, by mixing the N-polyhydroxyalkyl aromatic ortho-diamine with a suspension of alloxan monohydrate and boric acid in glacial acetic acid, the desired isoalloxazine thus-formed usually precipitating from the reaction mixture in substantially pure form.

Instead of using an N-monosubstituted aromatic ortho-diamine in the above-described condensation process, an N-monosubstituted aromatic ortho-nitroamine may be used as the starting material. The reduction of the ortho-nitroamine to the corresponding diamine and the subsequent condensation with alloxan may be carried out in a single step if the N-monosubstituted aromatic ortho-nitroamine is reacted with the alloxan compound in the presence of a reducing agent. A leuco compound of the isoalloxazine compound is formed which is subsequently dehydrogenated by treatment with a dehydrogenating agent. Reducing agents which can be used include tin, stannous chloride, iron, trivalent titanium, and the like. Suitable dehydrogenating agents such as atmospheric oxygen, potassium permanganate, halogens, quinoid dyestuffs, and the like, may be used.

Isoalloxazines are also prepared by reaction of ortho-aminoarylazo compounds or ring-substituted ortho-aminoarylazo compounds with barbituric acid in an acid medium (U.S. Patent 2,261,608).

Ortho-aminoarylazo compounds may also be condensed with alloxantin or dialuric acid to produce isoalloxazines in accordance with the procedure disclosed in U.S. Patent 2,374,661.

The starting aminoazo compounds are conveniently prepared by the coupling of substituted phenylamines containing alkyl, alkoxy, halo groups, and the like, with a diazotized amine in the manner described by Karrer, Helv. Chim. Acta. 18, 1130, 1935; 19, 264, 1936.

In another method used in the synthesis of isoalloxazines, the need for the above-indicated aminoazo compounds is eliminated since N-substituted aromatic amines such as ribityl or arabityl xylidine, and the like, or mineral salts thereof such as the hydrochlorides, or the like, can be condensed directly with violuric acid to yield isoalloxazines in a single step.

In another method, polyhydroxylated alkyl nitriles or their acyl derivatives may be reductively condensed with an aromatic amine to form the corresponding N-polyhydroxylated alkylamine or the acylated N-polyhydroxylated alkylamine, which may be coupled with a diazonium salt, the resulting compound reduced to form the corresponding diamine and the diamine thus obtained condensed with alloxan to form an isoalloxazine (U.S. Patent 2,261,608).

The various 6,7-dialkyl-9-polyhydroxyalkylisoalloxazines which are used in the preparation of 6,7-dialkyl-9-[ω-formylalkyl]-isoalloxazines may also be obtained according to the method of Karrer et al., Helv. Chim. Acta 17, 1165, 1516, (1934). The 6,7-dialkyl-9-[ω-formylalkyl]-isoalloxazines are reduced by the previously described method to form the preferred 6,7-dialkyl-9-[ω-hydroxyalkyl]-isoalloxazines of the invention.

A typical polyhydroxyalkylisoalloxazine, riboflavin, otherwise referred to as 6,7-dimethyl-9-(1'-D-ribityl)-isoalloxazine, was synthesized by Karrer, Helv. Chim. Acta 18, 522–35, 1935 and Kuhn, Ber. 68, 1765–74, 1935. The basis of both the Kuhn and Karrer processes is the condensation of N-(3,4-dimethyl-6-aminophenyl)-D-ribamine with alloxan to yield riboflavin. Karrer carried out this condensation in acid solution (U.S. Patents 2,155,555 and 2,237,074), where as Kuhn materially increased the yield of that condensation by effecting it in glacial acetic acid solution with the use of boric acid as a catalyst (U.S. Patent 2,238,874 and Ber. 68, 1282, 1935). The N-(3,4-dimethyl-6-aminophenyl)-D-ribamine required for this condensation with alloxan is prepared by conventional methods such as: (1) condensation of 4,5-dinitro-o-xylene with D-ribamine followed by catalytic reduction of the product thus obtained in aqueous alcoholic solution (Kuhn and Weygand, Ber. 68, 1001, 1935); or (2), condensation of 3,4-dimethyl-6-nitroaniline with D-ribose and reduction of the product thus obtained (Kuhn et al., Ber. 68, 1765, 1935; 70, 773, 1937); or (3), condensation of 3,4-dimethyl-6-carbethoxyaminoaniline (Karrer et al., Helv. Chim. Acta 18, 69, 1935; 18, 426, 1935) or 3,4-dimethyl-6-acetylaminoaniline (Karrer et al., Ber. 68, 216, 1935) with D-ribose, reduction and saponification of the resulting compound to obtain the free amine, N-(3,4-dimethyl-6-aminophenyl)-D-ribamine; or (4), condensation of 3,4-dimethylaniline with D-ribose, catalytic reduction of the resulting riboside to N-(3,4-dimethylphenyl)-D-ribamine, coupling thereof with an aryl diazonium salt to form the N-(3,4-dimethyl-6-arylazophenyl)-D-ribamine, and reduction of the compound thus produced to form N-(3,4-dimethyl-6-aminophenyl)-D-ribamine (Karrer et al., Helv. Chim. Acta 18, 1435, 1935).

Using the last-described procedure, other isoalloxazines, including those containing substituents in the 5, 6, 7 and 8 positions, may likewise be prepared. Thus, the starting [ω-formylalkyl]-isoalloxazines used in the preparation of the [ω-hydroxyalkyl]-isoalloxazines of the invention may be obtained by any of the procedures described supra or other conventional methods disclosed in the art.

The following preparations and examples are illustrative of the process and products of this invention and are not to be construed as limiting.

PREPARATION 1

6,7-Dimethyl-9-Formylmethylisoalloxazine

A suspension of 5.7 grams (0.015 mole) of 6,7-dimethyl-9-(1'-D-ribityl)-isoalloxazine (Karrer et al., Helv. Chim. Acta 17, 1516, 1934) in 150 milliliters of 2.0 normal sulfuric acid is prepared. The suspension is cooled to a temperature of five degrees centigrade and a solution of 12.6 grams (0.055 mole) of hydrated periodic acid ($HIO_4 \cdot 2H_2O$) in nineteen milliliters of water is added thereto and the mixture stirred, while cooled in an ice-bath, for about one hour until a clear solution is obtained. At this point, the acidity of the solution is adjusted to a pH of about 1.5 by the addition of solid sodium carbonate. One and one-half grams of activated carbon are added and the mixture is stirred for thirty minutes at room temperature. The carbon is removed by filtration and solid sodium carbonate is added to the filtrate until a copious precipitate is formed; at this point, the pH of the mixture is about 3.8. The precipitate is separated by centrifuging and washed successively with 100 milliliters of water, fifty milliliters of water, 100 milliliters of alcohol and fifty milliliters of alcohol, the separation of the solid being effected by centrifuging after each washing. After the last washing, the product is suspended in fifty milliliters of alcohol, filtered and dried in a vacuum desiccator over phosphorus pentoxide. The yellow-orange 6,7-dimethyl-9-formylmethylisoalloxazine monohydrate thus obtained weighs 3.4 grams (75 percent yield) and has a melting point of 258 to 259 degrees centigrade (uncorrected) with decomposition and previous darkening. On removal of one molecule of water from the hydrate by heating, 6,7-dimethyl-9-formylmethylisoalloxazine is obtained.

*Anal.*—Calculated for $C_{14}H_{12}N_4O_3 \cdot H_2O$: C, 55.6; H, 4.6; N, 18.5. Found: C, 56.0; H, 4.4; N, 18.2.

PREPARATION 2

6,7-Diethyl-9-Formylmethylisoalloxazine

Following the procedure described in Preparation 1 except for the substitution of 6,7-dimethyl-9-(1'-D-ribityl)-isoalloxazine by 6.1 grams of 6,7-diethyl-9-(1'-D-ribityl)-isoalloxazine (Lambooy, J. Am. Chem. Soc. 72, 5225, 1950) and the substitution of periodic acid by 22.2 grams of lead tetraacetate, 6,7-diethyl-9-formylmethylisoalloxazine is obtained.

PREPARATION 3

6-Ethyl-7-Methyl-9-Formylmethylisoalloxazine

Following the procedure described in Preparation 1 except for the substitution of 6,7-dimethyl-9-(1'-D-ribityl)-isoalloxazine by 5.9 grams of 6-ethyl-7-methyl-9-(1'-D-ribityl)-isoalloxazine (Karrer and Quibell, Helv. Chim. Acta 19, 1034, 1936), 6-ethyl-7-methyl-9-formylmethylisoalloxazine is obtained.

PREPARATION 4

*6-Methyl-7-Amino-9-Formylmethylisoalloxazine*

Following the procedure described in Preparation 1 except for the substitution of 6,7-dimethyl-9-(1'-D-ribityl)-isoalloxazine by 5.7 grams of 6-methyl-7-amino-9-(1'-D-arabityl)-isoalloxazine (Nishida, Rpts. Sci. Res. Inst., Japan 25, 323, 1949), 6-methyl-7-amino-9-formylmethylisoalloxazine is obtained.

PREPARATION 5

*6,7-Dimethoxy-9-Formylmethylisoalloxazine*

Following the procedure described in Preparation 1 except for the substitution of 6,7-dimethyl-9-(1'-D-ribityl)-isoalloxazine by 6.1 grams of 6,7-dimethoxy-9-(1'-D-arabityl)-isoalloxazine, 6,7-dimethoxy-9-formylmethylisoalloxazine is obtained.

PREPARATION 6

*6,7-Tetramethylene-9-Formylmethylisoalloxazine*

Following the procedure described in Preparation 1 except for the substitution of 6,7-dimethyl-9-(1'-D-ribityl)-isoalloxazine by 6.0 grams of 6,7-tetramethylene-9-(1'-D-arabityl)-isoalloxazine (Kuhn, Ber. 70, 1302, 1937), 6,7-tetramethylene-9-formylmethylisoalloxazine is obtained.

PREPARATION 7

*6,7-Dimethyl-9-[β-Formylethyl]-Isoalloxazine*

Following the procedure described in Preparation 1 except for the substitution of 6,7-dimethyl-9-(1'-D-ribityl)-isoalloxazine by 5.5 grams of 6,7-dimethyl-9-(1'-D-desoxyribityl)-isoalloxazine (Karrer et al., Helv. Chim. Acta 18, 1144, 1935) and the use of 7.5 grams of periodic acid, 6,7-dimethyl-9-[β-formylethyl]-isoalloxazine is obtained.

PREPARATION 8

*6,7-Dimethyl-9-[γ-Formylpropyl]-Isoalloxazine*

Following the procedure described in Preparation 1 except for the substitution of 6,7-dimethyl-9-(1'-D-ribityl)-isoalloxazine by 5.2 grams of 6,7-dimethyl-9-(4',5'-dihydroxyamyl)-isoalloxazine, 6,7-dimethyl-9-[γ-formylpropyl]-isoalloxazine is obtained.

PREPARATION 9

*6-Methoxy-7-Amino-9-Formylmethylisoalloxazine*

Following the procedure described in Preparation 1 except for the substitution of 6,7-dimethyl-9-(1'-D-ribityl)-isoalloxazine by 5.9 grams of 6-methoxy-7-amino-9-(1'-D-ribityl)-isoalloxazine, 6-methoxy-7-amino-9-formylmethylisoalloxazine is obtained.

PREPARATION 10

*5,6,7,8-Tetramethyl-9-Formylmethylisoalloxazine*

Following the procedure described in Preparation 1 except for the substitution of 6,7-dimethyl-9-(1'-D-ribityl)-isoalloxazine by 6.1 grams of 5,6,7,8-tetramethyl-9-(1'-L-arabityl)-isoalloxazine and the use of 11.4 grams of periodic acid, 5,6,7,8-tetramethyl-9-formylmethylisoalloxazine is obtained.

PREPARATION 11

*5,6,7-Trimethyl-9-Formylmethylisoalloxazine*

Following the procedure described in Preparation 1 except for the substitution of 6,7-dimethyl-9-(1'-D-ribityl)-isoalloxazine by 5.85 grams of 5,6,7-trimethyl-9-(1'-D-ribityl)-isoalloxazine by 5.85 grams of 5,6,7-trimethyl-9-(1'-D-ribityl)-isoalloxazine, 5,6,7-trimethyl-9-formylmethylisoalloxazine is obtained.

PREPARATION 12

*6,7,8-Trimethyl-9-Formylmethylisoalloxazine*

Following the procedure described in Preparation 1 except for the substitution of 6,7-dimethyl-9-(1'-D-ribityl)-isoalloxazine by 5.85 grams of 6,7,8-trimethyl-9-(1'-L-arabityl)-isoalloxazine, 6,7,8-trimethyl-9-formylmethylisoalloxazine is obtained.

PREPARATION 13

*5,7-Dimethyl-6-Methoxy-9-Formylmethylisoalloxazine*

Following the procedure described in Preparation 1 except for the substitution of 6,7-dimethyl-9-(1'-D-ribityl)-isoalloxazine by 6.1 grams of 5,7-dimethyl-6-methoxy-9-(1'-L-xylityl)-isoalloxazine, 5,7-dimethyl-6-methoxyl-9-formylmethylisoalloxazine is obtained.

PREPARATION 14

*5,6,8-Trimethyl-7-Amino-9-Formylmethylisoalloxazine*

Following the procedure described in Preparation 1 except for the substitution of 6,7-dimethyl-9-(1'-D-ribityl)-isoalloxazine by 6.5 grams of 5,6,8-trimethyl-7-amino-9-(1'-D-dulcityl)-isoalloxazine and the use of 15.0 grams of periodic acid, 5,6,8-trimethyl-7-amino-9-formylmethylisoalloxazine is obtained.

PREPARATION 15

*5,7,8-Trimethyl-6-Amino-9-Formylmethylisoalloxazine*

Following the procedure described in Preparation 1 except for the substitution of 6,7-dimethyl-9-(1'-D-ribityl)-isoalloxazine by 6.5 grams of 5,7,8-trimethyl-6-amino-9-(1'-D-dulcityl)-isoalloxazine and the use of 15.0 grams of periodic acids, 5,7,8-trimethyl-6-amino-9-formylmethylisoalloxazine is obtained.

PREPARATION 16

*6,7-Dichloro-9-Formylmethylisoalloxazine*

Following the procedure described in Preparation 1 except for the substitution of 6,7-dimethyl-9-(1'-D-ribityl)-isoalloxazine by 6.2 grams of 6,7-dichloro-9-(1'-D-ribityl)-isoalloxazine (Shunk et al., J. Am. Chem. Soc. 74, 4251, 1952), 6,7-dichloro-9-formylmethylisoalloxazine is obtained.

PREPARATION 17

*6,7-Dibromo-9-Formylmethylisoalloxazine*

Following the procedure described in Preparation 1 except for the substitution of 6,7-dimethyl-9-(1'-D-ribityl)-isoalloxazine by 7.6 grams of 6,7-dibromo-9-(1'-D-ribityl)-isoalloxazine (Weygand et al., Ber. 76, 1044, 1943), 6,7-dibromo-9-formylmethylisoalloxazine is obtained.

PREPARATION 18

*5-Methoxy-6-Amino-9-Formylmethylisoalloxazine*

Following the procedure described in Preparation 1 except for the substitution of 6,7-dimethyl-9-(1'-D-ribityl)-isoalloxazine by 5.9 grams of 5-methoxy-6-amino-9-(1' - D - ribityl)-isoalloxazine (obtained by condensing 3-amino-2,6-dinitroanisole [Reverdin and Widmer, Ber. 46, 4075] with ribose, and reducing to obtain 2,4-diamino-3-methoxy-N-ribitylaniline and then condensing the latter compound with alloxan), 5-methoxy-6-amino-9-formylmethylisoalloxazine is obtained.

PREPARATION 19

*5-Amino-6-Methoxy-9-Formylmethylisoalloxazine*

Following the procedure described in Preparation 1 except for the substitution of 6,7-dimethyl-9-(1'-D-ribityl)-isoalloxazine by 5.9 grams of 5-amino-6-methoxy-9-(1' - D - ribityl)-isoalloxazine (obtained by condensing 4-amino-2,3-dinitroanisole [Reverdin and DeLuc, Ber. 45, 353; 43, 3462] with ribose and reducing to obtain 2,3- diamino-4-methoxy-N-ribitylaniline and condensing the latter compound with alloxan), 5-amino-6-methoxy-9-formylmethylisoalloxazine is obtained.

PREPARATION 20

6-Methoxy-8-Amino-9-Formylmethylisoalloxazine

Following the procedure described in Preparation 1 except for the substitution of 6,7-dimethyl-9-(1'-D-ribityl)-isoalloxazine by 5.9 grams of 6-methoxy-8-amino-9-(1' - D - ribityl)-isoalloxazine (obtained by condensing 4-amino-3,5-dinitroanisole [Reverdin, Ber. 42, 1524] with ribose and reducing and then condensing the 2,6-diamino-4-methoxy-N-ribitylaniline thus obtained with alloxan), 6-methoxy - 8 - amino - 9 - formylmethylisoalloxazine is obtained.

PREPARATION 21

6-Amino-8-Methoxy-9-Formylmethylisoalloxazine

Following the procedure described in Preparation 1 except for the substitution of 6,7-dimethyl-9-(1'-D-ribityl)-isoalloxazine by 5.9 grams of 6-amino-8-methoxy-9-(1' - D - ribityl)-isoalloxazine (obtained by condensing 2-amino-3,5-dinitroanisole [Meldola and Hay, J. Chem. Soc. 91, 1477], with ribose and reducing to obtain 2-methoxy-4,6-diamino-N-ribitylaniline and condensing the later compound with alloxan), 6-amino-8-methoxy-9-formylmethylisoalloxazine is obtained.

PREPARATION 22

6-Methyl-9-Formylmethylisoalloxazine

Following the procedure described in Preparation 1 except for the substitution of 6,7-dimethyl-9-(1'-D-ribityl)-isoalloxazine by 5.4 grams of 6-methyl-9-(1'-D-ribityl)-isoalloxazine (Karrer et al., Helv. Chim. Acta 18, 1143, 1343, [1935]), 6-methyl-9-formylmethylisoalloxazine is obtained.

PREPARATION 23

7-Methyl-9-Formylmethylisoalloxazine

Following the procedure described in Preparation 1 except for the substitution of 6,7-dimethyl-9-(1'-D-ribityl)-isoalloxazine by 5.4 grams of 7-methyl-9-(1'-D-ribityl)-isoalloxazine (Karrer et al., Helv. Chim. Acta 18, 1143, 1343, [1935]), 7-methyl-9-formylmethylisoalloxazine is obtained.

Similarly, other [ω-formylalkyl]-isoalloxazines are prepared such as, for example, 6,7-trimethylene-9-formylmethylisoalloxazine,
6-methyl-7-ethyl-9-formylmethylisoalloxazine,
6-methyl-7-propyl-9-formylmethylisoalloxazine,
6,7-dimethyl-9-[δ-formylbutyl]-isoalloxazine,
6,7-dimethyl-9-[ε-formylamyl]-isoalloxazine,
6,7-diethyl-9-[β-formylethyl]-isoalloxazine,
6,7-diethoxy-9-formylmethylisoalloxazine,
6,7-dipropyl-9-formylmethylisoalloxazine,
6,7-dipropoxy-9-formylmethylisoalloxazine,
6-methyl-7-chloro-9-formylmethylisoalloxazine,
6-chloro-7-methyl-9-formylmethylisoalloxazine,
6-amino-7-methoxy-9-formylmethylisoalloxazine,
6-methyl-9-[β-formylethyl]-isoalloxazine,
7-methyl-9-[β-formylethyl]-isoalloxazine,
7-ethyl-9-formylmethylisoalloxazine,
8-methyl-9-formylmethylisoalloxazine,
6-methoxy-7-amino-9-[β-formylethyl]-isoalloxazine,
6,7-dimethoxy-9-[β-formylethyl]-isoalloxazine,
6-propyl-7-methyl-9-formylmethylisoalloxazine,
6-methyl-7-propyl-9-[β-formylethyl]-isoalloxazine,
6,7-diamyl-9-formylmethylisoalloxazine,
6,7-dibutyl-9-formylmethylisoalloxazine,
5,6,7-trimethyl-9-[β-formylethyl]-isoalloxazine,
5,6,7-trimethyl-8-methoxy-9-formylmethylisoalloxazine,
6,8-dimethoxy-7-methyl-9-formylmethylisoalloxazine,
6-methoxy-7,8-dimethyl-9-formylmethylisoalloxazine,
5,7-dimethyl-6-methoxy-9-[β-formylethyl]-isoalloxazine,
5,8-dimethyl-6,7-diethoxy-9-formylmethylisoalloxazine,
5,6,8-trimethyl-7-amino-9-[β-formylethyl]-isoalloxazine,
5,6,7,8-tetramethyl-9-[β-formylethyl]-isoalloxazine,
7-isobutyl-9-formylmethylisoalloxazine,
6-isobutyl-9-formylmethylisoalloxazine,
8-isobutyl-9-formylmethylisoalloxazine,
6-isopropyl-8-methyl-9-formylmethylisoalloxazine,
5-isopropyl-8-methyl-9-formylmethylisoalloxazine, and the like.

EXAMPLE 1

6,7-Dimethyl-9-[β-Hydroxyethyl]-Isoalloxazine 28.4 grams (0.10 mole) of 6,7-dimethyl-9-formylmethylisoalloxazine (Preparation 1) is suspended in 250 milliliters of 0.4 N sodium hydroxide. (To prevent decomposition, reactants are protected from light.) A solution of 3.7 grams (0.10 mole) of sodium borohydride in 25 milliliters of water is added thereto. An immediate reaction occurs as indicated by the formation of a greenish precipitate. After stirring for two hours, the mixture is cooled in an ice-bath and the pH adjusted to pH 4.0 to pH 4.5 with glacial acetic acid. The solid material thus obtained is washed successively with acidified water, acetone and ether. After drying at a temperature of about sixty degrees centigrade, there is obtained 25.33 grams (88.4 percent yield) of a yellow solid, 6,7-dimethyl-9-[β-hydroxyethyl]-isoalloxazine, melting between 299 and 301 degrees centigrade, uncorrected.

EXAMPLE 2

6,7-Diethyl-9-[β-Hydroxyethyl]-Isoalloxazine

Following the procedure described in Example 1 except for the substitution of 6,7-dimethyl-9-formylmethylisoalloxazine by 31.2 grams of 6,7-diethyl-9-formylmethylisoalloxazine (Preparation 2), 6,7-diethyl-9-[β-hydroxyethyl]-isoalloxazine is obtained.

EXAMPLE 3

6-Ethyl-7-Methyl-9-[β-Hydroxyethyl]-Isoalloxazine

Following the procedure described in Example 1 except for the substitution of 6,7-dimethyl-9-formylmethylisoalloxazine by 29.8 grams of 6-ethyl-7-methyl-9-formylmethylisoalloxazine (Preparation 3) and the use of 5.1 grams of potassium borohydride instead of sodium borohydride, 6-ethyl-7-methyl-9-[β-hydroxyethyl]-isoalloxazine is obtained.

EXAMPLE 4

6-Methyl-7-Amino-9-[β-Hydroxyethyl]-Isoalloxazine

Following the procedure described in Example 1 except for the substitution of 6,7-dimethyl-9-formylmethylisoalloxazine by 28.5 grams of 6-methyl-7-amino-9-formylmethylisoalloxazine (Preparation 4), 6-methyl-7-amino-9-[β-hydroxyethyl]-isoalloxazine is obtained.

EXAMPLE 5

6,7-Dimethoxy-9-[β-Hydroxyethyl]-Isoalloxazine

Following the procedure described in Example 1 except for the substitution of 6,7-dimethyl-9-formylmethylisoalloxazine by 31.6 grams of 6,7-dimethoxy-9-formylmethylisoalloxazine (Preparation 5), 6,7-dimethoxy-9-[β-hydroxyethyl]-isoalloxazine is obtained.

EXAMPLE 6

6,7-Tetramethylene-9-[β-Hydroxyethyl]-Isoalloxazine

Following the procedure described in Example 1 except for the substitution of 6,7-dimethyl-9-formylmethylisoalloxazine by 32.8 grams of 6,7-tetramethylene-9-formylmethylisoalloxazine (Preparation 6), 6,7-tetramethylene-9-[β-hydroxyethyl]-isoalloxazine is obtained.

EXAMPLE 7
6,7-Dimethyl-9-[γ-Hydroxypropyl]-Isoalloxazine

Following the procedure described in Example 1 except for the substitution of 6,7-dimethyl-9-formylmethylisoalloxazine by 29.8 grams of 6,7-dimethyl-9-[β-formylethyl] isoalloxazine (Preparation 7), 6,7-dimethyl-9-[γ-hydroxypropyl]-isoalloxazine is obtained.

EXAMPLE 8
6,7-Dimethyl-9-[δ-Hydroxybutyl]-Isoalloxazine

Following the procedure described in Example 1 except for the substitution of 6,7-dimethyl-9-formylmethylisoalloxazine by 31.2 grams of 6,7-dimethyl-9-[γ-formylpropyl]-isoalloxazine (Preparation 8), 6,7-dimethyl-9-[δ-hydroxybutyl]-isoalloxazine is obtained.

EXAMPLE 9
6-Methoxy-7-Amino-9-[β-Hydroxyethyl]-Isoalloxazine

Following the procedure described in Example 1 except for the substitution of 6,7-dimethyl-9-formylmethylisoalloxazine by 30.1 grams of 6-methoxy-7-amino-9-formylmethylisoalloxazine (Preparation 9), 6-methoxy-7-amino-9-[β-hydroxyethyl]-isoalloxazine is obtained.

EXAMPLE 10
5,6,7,8-Tetramethyl-9-[β-Hydroxyethyl]-Isoalloxazine

Following the procedure described in Example 1 except for the substitution of 6,7-dimethyl-9-formylmethylisoalloxazine by 31.2 grams of 5,6,7,8-tetramethyl-9-formylmethylisoalloxazine (Preparation 10), 5,6,7,8-tetramethyl-9-[β-hydroxyethyl]-isoalloxazine is obtained.

EXAMPLE 11
5,6,7-Trimethyl-9-[β-Hydroxyethyl]-Isoalloxazine

Following the procedure described in Example 1 except for the substitution of 6,7-dimethyl-9-formylmethylisoalloxazine by 29.8 grams of 5,6,7-trimethyl-9-formylmethylisoalloxazine (Preparation 11), 5,6,7-trimethyl-9-[β-hydroxyethyl]-isoalloxazine is obtained.

EXAMPLE 12
6,7,8-Trimethyl-9-[β-Hydroxyethyl]-Isoalloxazine

Following the procedure described in Example 1 except for the substitution of 6,7-dimethyl-9-formylmethylisoalloxazine by 29.8 grams of 6,7,8-trimethyl-9-formylmethylisoalloxazine (Preparation 12), 6,7,8-trimethyl-9-[β-hydroxyethyl]-isoalloxazine is obtained.

EXAMPLE 13
5,7-Dimethyl-6-Methoxy-9-[β-Hydroxyethyl]-Isoalloxazine

Following the procedure described in Example 1 except for the substitution of 6,7-dimethyl-9-formylmethylisoalloxazine by 31.4 grams of 5,7-dimethyl-6-methoxy-9-formylmethylisoalloxazine (Preparation 13), 5,7-dimethyl-6-methoxy-9-[β-hydroxyethyl]-isoalloxazine is obtained.

EXAMPLE 14
5,6,8-Trimethyl-7-amino-9-[β-Hydroxyethyl]-Isoalloxazine

Following the procedure described in Example 1 except for the substitution of 6,7-dimethyl-9-formylmethylisoalloxazine by 31.3 grams of 5,6,8-trimethyl-7-amino-9-formylmethylisoalloxazine (Preparation 14), 5,6,8-trimethyl-7-amino-9-[β-hydroxyethyl]-isoalloxazine is obtained.

EXAMPLE 15
5,7,8-Trimethyl-6-Amino-9-[β-Hydroxyethyl]-Isoalloxazine

Following the procedure described in Example 1 except for the substitution of 6,7-dimethyl-9-formylmethylisoalloxazine by 31.3 grams of 5,7,8-trimethyl-6-amino-9-formylmethylisoalloxazine (Preparation 15), 5,7,8-trimethyl-6-amino-9-[β-hydroxyethyl]-isoalloxazine is obtained.

EXAMPLE 16
6,7-Dichloro-9-[β-Hydroxyethyl]-Isoalloxazine

Following the procedure described in Example 1 except for the substitution of 6,7-dimethyl-9-formylmethylisoalloxazine by 32.5 grams of 6,7-dichloro-9-formylmethylisoalloxazine (Preparation 16), 6,7-dichloro-9-[β-hydroxyethyl]-isoalloxazine is obtained.

EXAMPLE 17
6,7-Dibromo-9-[β-Hydroxyethyl]-Isoalloxazine

Following the procedure described in Example 1 except for the substitution of 6,7-dimethyl-9-formylmethylisoalloxazine by 41.4 grams of 6,7-dibromo-9-formylmethylisoalloxazine (Preparation 17), 6,7-dibromo-9-[β-hydroxyethyl]-isoalloxazine is obtained.

EXAMPLE 18
5-Methoxy-6-Amino-9-[β-Hydroxyethyl]-Isoalloxazine

Following the procedure described in Example 1 except for the substitution of 6,7-dimethyl-9-formylmethylisoalloxazine by 30.1 grams of 5-methoxy-6-amino-9-formylmethylisoalloxazine (Preparation 18), 5-methoxy-6-amino-9-[β-hydroxyethyl]-isoalloxazine is obtained.

EXAMPLE 19
5-Amino-6-Methoxy-9-[β-Hydroxyethyl]-Isoalloxazine

Following the procedure described in Example 1 except for the substitution of 6,7-dimethyl-9-formylmethylisoalloxazine by 30.1 grams of 5-amino-6-methoxy-9-formylmethylisoalloxazine (Preparation 19), 5-amino-6-methoxy-9-[β-hydroxyethyl]-isoalloxazine is obtained.

EXAMPLE 20
6-Methoxy-8-Amino-9-[β-Hydroxyethyl]-Isoalloxazine

Following the procedure described in Example 1 except for the substitution of 6,7-dimethyl-9-formylmethylisoalloxazine by 30.1 grams of 6-methoxy-8-amino-9-formylmethylisoalloxazine (Preparation 20), 6-methoxy-8-amino-9-[β-hydroxyethyl]-isoalloxazine is obtained.

EXAMPLE 21
6-Amino-8-Methoxy-9-[β-Hydroxyethyl]-Isoalloxazine

Following the procedure described in Example 1 except for the substitution of 6,7-dimethyl-9-formylmethylisoalloxazine by 30.1 grams of 6-amino-8-methoxy-9-formylmethylisoalloxazine (Preparation 21), 6-amino-8-methoxy-9-[β-hydroxyethyl]-isoalloxazine is obtained.

EXAMPLE 22
6-Methyl-9-[β-Hydroxyethyl]-Isoalloxazine

Following the procedure described in Example 1 except for the substitution of 6,7-dimethyl-9-formylmethylisoalloxazine by 27.0 grams of 6-methyl-9-formylmethylisoalloxazine (Preparation 22), 6-methyl-9-[β-hydroxyethyl]-isoalloxazine is obtained.

EXAMPLE 23
7-Methyl-9-[β-Hydroxyethyl]-Isoalloxazine

Following the procedure described in Example 1 except for the substitution of 6,7-dimethyl-9-formylmethylisoalloxazine by 27.0 grams of 7-methyl-9-formylmethylisoalloxazine (Preparation 23), 7-methyl-9-[β-hydroxyethyl]-isoalloxazine is obtained.

Similarly, other [ω-hydroxyethyl]-isoalloxazines are prepared such as, for example, 6,7-trimethylene-9-[β-hydroxyethyl]-isoalloxazine,
6-methyl-7-ethyl-9-[β-hydroxyethyl]-isoalloxazine,
6,7-dimethyl-9-[ε-hydroxyamyl]-isoalloxazine,
6,7-dimethyl-9-[δ-hydroxyhexyl]-isoalloxazine,
6,7-diethyl-9-[γ-hydroxypropyl]-isoalloxazine, 6,7-diethoxy-9-[β-hydroxyethyl]-isoalloxazine,
6,7-dipropyl-9-[β-hydroxyethyl]-isoalloxazine,
6,7-dipropoxy-9-[β-hydroxyethyl]-isoalloxazine,
6-amino-7-methoxy-9-[β-hydroxyethyl]-isoalloxazine,
6-amino-7-methoxy-9-[γ-hydroxypropyl]-isoalloxazine,
6-chloro-7-methyl-9-[β-hydroxyethyl]-isoalloxazine,
6-methyl-7-propyl-9-[β-hydroxyethyl]-isoalloxazine,
6-methyl-9-[γ-hydroxypropyl]-isoalloxazine,
7-methyl-9-[γ-hydroxypropyl]-isoalloxazine,
7-ethyl-9-[β-hydroxyethyl]-isoalloxazine,
8-methyl-9-[β-hydroxyethyl]-isoalloxazine,
6-methoxy-7-amino-9-[γ-hydroxypropyl]-isoalloxazine,
6-propyl-7-methyl-9-[γ-hydroxypropyl]-isoalloxazine,
6-methyl-7-propyl-9-[γ-hydroxypropyl]-isoalloxazine,
6,7-diamyl-9-[β-hydroxyethyl]-isoalloxazine,
6,7-dibutyl-9-[β-hydroxyethyl]-isoalloxazine
5,6,7-trimethyl-9-[γ-hydroxypropyl]-isoalloxazine,
5,6,7-trimethyl-8-methoxy-9-[β-hydroxyethyl]-isoalloxazine,
6,8-dimethoxy-7-methyl-9-[β-hydroxyethyl]-isoalloxazine,
6-methoxy-7,8-dimethyl-9-[β-hydroxyethyl]-isoalloxazine,
5,7-dimethyl-6-methoxy-9-[γ-hydroxypropyl]-isoalloxazine,
5,8-dimethyl-6,7-diethoxy-9-[β-hydroxyethyl]-isoalloxazine,
5,6,8-trimethyl-7-amino-9-[γ-hydroxypropyl]-isoalloxazine,
5,6,7,8-tetramethyl-9-[γ-hydroxypropyl]-isoalloxazine,
7-isobutyl-9-[β-hydroxyethyl]-isoalloxazine,
6-isobutyl-9-[β-hydroxyethyl]-isoalloxazine,
8-isobutyl-9-[β-hydroxyethyl]-isoalloxazine,
6-isopropyl-8-methyl-9-[β-hydroxyethyl]-isoalloxazine,
5-isopropyl-8-methyl-9-[β-hydroxyethyl]-isoalloxazine,
5,6,7,8-tetramethyl-9-[δ-hydroxybutyl]-isoalloxazine,
and the like.

It is to be understood that the invention is not to be limited to the exact details of operation or compounds shown and described, as obvious modifications and equivalents will be apparent to one skilled in the art, and the invention is therefore to be limited only by the scope of the appended claims.

We claim:
1. Compounds represented by the formula:

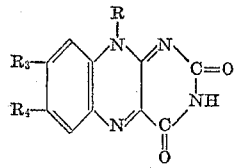

wherein R is an ω-monohydroxyalkyl group containing from two to six carbon atoms inclusive and $R_3$ and $R_4$ are lower-alkoxy.

2. Compounds represented by the formula:

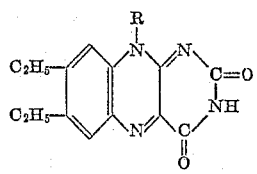

wherein R is an ω-monohydroxyalkyl group containing from two to six carbon atoms inclusive.

3. Compounds represented by the formula:

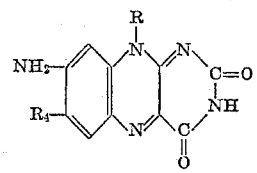

wherein $R_4$ is lower-alkyl and R is an ω-monohydroxyalkyl group containing from two to six carbon atoms inclusive.

4. Compounds represented by the formula:

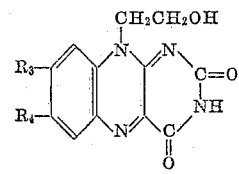

wherein $R_3$ and $R_4$ are lower-alkoxy.

5. Compounds represented by the formula:

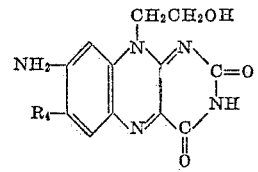

wherein $R_4$ is lower-alkyl.

6. 6,7-diethyl-9-[β-monohydroxyethyl]-isoalloxazine.
7. 6-ethyl-7-methyl-9-[β-monohydroxyethyl]-isoalloxazine.
8. 6-methyl-7-amino-9-[β-monohydroxyethyl]-isoalloxazine.
9. 6,7-dimethoxy-9-[β-monohydroxyethyl]-isoalloxazine.

10. A process which comprises reducing an [ω-formylalkyl]-isoalloxazine of the formula:

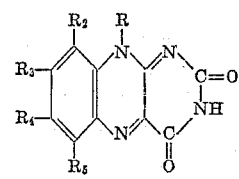

wherein R is an ω-formylalkyl group containing from two to six carbon atoms inclusive, $R_2$ and $R_5$ are members selected from the group consisting of hydrogen, lower-alkyl, lower-alkoxy, and amino, $R_3$ and $R_4$ are members selected from the group consisting of hydrogen, a polymethylene group linked to the aromatic ring to form a carbocyclic ring having six carbon atoms, lower-alkyl, lower-alkoxy, halo and amino, and wherein $R_2$, $R_3$, $R_4$ and $R_5$ when taken together include not more than one amino group, by mixing, in the absence of light, a solution containing said [ω-formylalkyl]-isoalloxazine with an alkali-metal hydride to obtain the corresponding [ω-hydroxyalkyl]-isoalloxazine.

11. A process for the preparation of a compound of the formula:

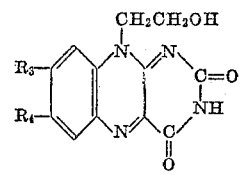

wherein $R_3$ and $R_4$ are lower-alkyl, which comprises mixing, in the absence of light, a solution containing a compound of the formula:

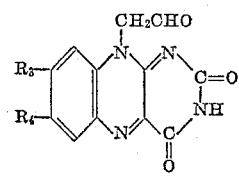

wherein $R_3$ and $R_4$ are as defined above, with an alkali-metal hydride.

12. A process for the preparation of a compound of the formula:

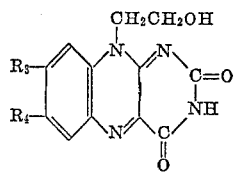

wherein $R_3$ and $R_4$ are lower-alkoxy, which comprises mixing, in the absence of light, a solution containing a compound of the formula:

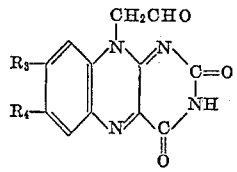

wherein $R_3$ and $R_4$ are as defined above, with an alkali-metal hydride.

13. A process for the preparation of 6,7-dimethyl-9-[β-hydroxyethyl]-isoalloxazine which comprises mixing, in the absence of light, a solution containing 6,7-dimethyl-9-formylmethylisoalloxazine with an alkali-metal hydride.

14. A process for the preparation of 6,7-dimethyl-9-[β-hydroxyethyl]-isoalloxazine which comprises mixing, in the absence of light, a solution containing 6,7-dimethyl-9-formylmethylisoalloxazine with an alkali-metal borohydride.

15. A process for the preparation of 6,7-dimethyl-9-[β-hydroxyethyl]-isoalloxazine which comprises mixing, in the absence of light, a solution containing 6,7-dimethyl-9-formylmethylisoalloxazine with sodium borohydride.

16. A process for the preparation of 6,7-dimethyl-9-[β-hydroxyethyl]-isoalloxazine which comprises mixing, in the absence of light, a solution containing 6,7-dimethyl-9-formylmethylisoalloxazine with potassium borohydride.

17. A process for the preparation of 6,7-diethyl-9-[β-hydroxyethyl]-isoalloxazine which comprises mixing, in the absence of light, a solution containing 6,7-diethyl-9-formylmethylisoalloxazine with an alkali-metal borohydride.

18. A process for the preparation of 6-ethyl-7-methyl-9-[β-hydroxyethyl]-isoalloxazine which comprises mixing, in the absence of light, a solution containing 6-ethyl-7-methyl-9-formylmethylisoalloxazine with an alkali-metal borohydride.

19. A process for the preparation of a compound of the formula:

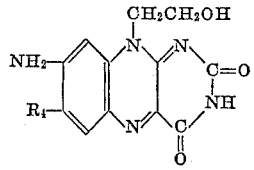

wherein $R_4$ is lower-alkyl, which comprises mixing, in the absence of light, a solution containing a compound of the formula:

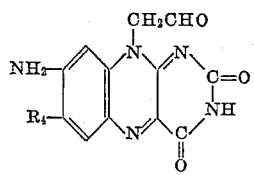

wherein $R_4$ is as defined above, with an alkali-metal hydride.

20. A process for the preparation of 6-methyl-7-amino-9-[β-hydroxyethyl]-isoalloxazine which comprises mixing, in the absence of light, a solution containing 6-methyl-7-amino-9-formylmethylisoalloxazine with an alkali-metal borohydride.

21. A process for the preparation of 6,7-dimethoxy-9-[β-hydroxyethyl]-isoalloxazine which comprises mixing, in the absence of light, a solution containing 6,7-dimethoxy-9-formylmethylisoalloxazine with an alkali-metal borohydride.

References Cited in the file of this patent

UNITED STATES PATENTS

| | | |
|---|---|---|
| 2,111,491 | Kuhn et al. | Mar. 15, 1938 |
| 2,155,555 | Karrer | Apr. 25, 1939 |

FOREIGN PATENTS

| | | |
|---|---|---|
| 107,251 | Australia | Apr. 21, 1939 |